United States Patent [19]

Van Landeghem et al.

[11] 4,386,431
[45] May 31, 1983

[54] X-RAY FILM CASSETTE

[75] Inventors: Willy K. Van Landeghem, St. Gillis Waas; Petrus J. De Maayer, Ranst; François P. Loots, Mortsel; Hendrik A. Pattyn, Willrjk, all of Belgium; Walter Bauer, Munich, Fed. Rep. of Germany; Heinrich Farber, Munich, Fed. Rep. of Germany; Jürgen Müller, Munich, Fed. Rep. of Germany; Manfred Schmidt, Munich, Fed. Rep. of Germany

[73] Assignee: Agfa-Gevaert AG, Leverkusen, Fed. Rep. of Germany

[21] Appl. No.: 320,718

[22] Filed: Nov. 12, 1981

[30] Foreign Application Priority Data

Nov. 14, 1980 [DE] Fed. Rep. of Germany ....... 3043070

[51] Int. Cl.³ .............................................. G03B 41/18
[52] U.S. Cl. ..................................... 378/187; 378/188
[58] Field of Search ................................ 378/187, 188

[56] References Cited

U.S. PATENT DOCUMENTS

4,166,958  9/1979  Haselbarth ......................... 378/187
4,264,821  4/1981  Bauer ................................. 378/188

FOREIGN PATENT DOCUMENTS

931921  8/1955  Fed. Rep. of Germany ...... 378/188

*Primary Examiner*—Alfred E. Smith
*Assistant Examiner*—T. N. Grigsby
*Attorney, Agent, or Firm*—Michael J. Striker

[57] ABSTRACT

An X-ray film cassette has body and cover parts movable relative to one another between open and closed positions and provided with locking elements, magnetic and counter plates associated with these parts and attractable to one another, at least one reinforcing foil arranged to be brought together with a film between the magnetic and counter plates, wherein the reinforcing foil has a surface arranged to face toward the film and being rough with a roughness of between 10 and 60 microns.

16 Claims, 4 Drawing Figures

X-RAY FILM CASSETTE

BACKGROUND OF THE INVENTION

The present invention relates to an X-ray film cassette.

X-ray film cassettes are known in the art. A known X-ray film cassette has a body part, a cover part, a locking or connecting element for closing both cassette parts, at least one reinforcing foil, a magnetic plate having a size corresponding to the size of the film, a counterplate attractable by the magnetic force of the magnetic plate. An X-ray film and the reinforcing foil are held between the magnetic plate and the counterplate, and the magnetic plate and/or counterplate are elastically mounted on the respective cassette parts. Such a film cassette is disclosed, for example, in the German Offenlegungsschrift No. 2,802,730.7. It has been shown that in this cassette, after insertion of a new film and locking the cassette, particularly in the event of large size cassettes, an air pocket can form between the film and the reinforcing foil. This air pocket displaces after a certain time, because of the attractive force acting between the magnetic plate and the counterplate, to the edge and can open the latter. This can correspond to greater time than the time between the charging and the use of the cassette. This means that the X-ray exposure takes place in condition of an air pocket, which can lead to a not sharp region in the picture, depending upon the thickness of the air pocket.

SUMMARY OF THE INVENTION

Accordingly, it is an object of the present invention to provide an X-ray film cassette which avoids the disadvantages of the prior art.

More particularly, it is an object of the present invention to provide an X-ray film cassette which allows to avoid or to quickly eliminate an air pocket between a reinforcing foil and a film.

In keeping with these objects and with others which will become apparent hereinafter, one feature of the present invention resides, briefly stated, in an X-ray cassette having body and cover parts, locking means, magnetic and counterplates, and a reinforcing foil, wherein the reinforcing foil has a surface arranged to face toward the film and being rough with a roughness of between 10 and 60 microns.

When the cassette is designed in accordance with the present invention, air located between the reinforcing foil and the film can flow out very fast during closing of the cassette. This provides for the advantage that, during opening of the cassette, the air can also flow into a space between the film and the reinforcing foil so as to avoid so-called sticking of the film to the reinforcing foil. When the invention rough reinforcing foil is utilized, the quality of the picture is increased, on the one hand, and there is a possibility to use the cassette with a fast pace, on the other hand.

When the rough reinforcing foil is utilized, the holding ability of the reinforcing foil is also increased, and thereby a uniform picture quality over a longer time is obtained, since during insertion of the film which slides over the reinforcing foil it runs only over the raised foil part.

The preferable roughness of the reinforcing foil can be within 25–50 micrometers. The rough surface of the reinforcing foil can be formed by embossing with a hot roller or squeegee. On the other hand, the roughness of the reinforcing foil can be formed by a plurality of particles extending outwardly beyond a relatively smooth face of the foil. The particles can be formed as grains or balls. The rough surface of the reinforcing foil may include at most 150 particles, advantageously between 800 and 1200 particles per square centimeter. The particles forming the rough surface of the reinforcing foil are light-permeable.

Finally, the magnetic and/or counterplate can be mounted on the respective parts of the cassette by an elastic strip which extends over the entire contour of the edges of the respective parts and can be formed of an elastic foam material.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
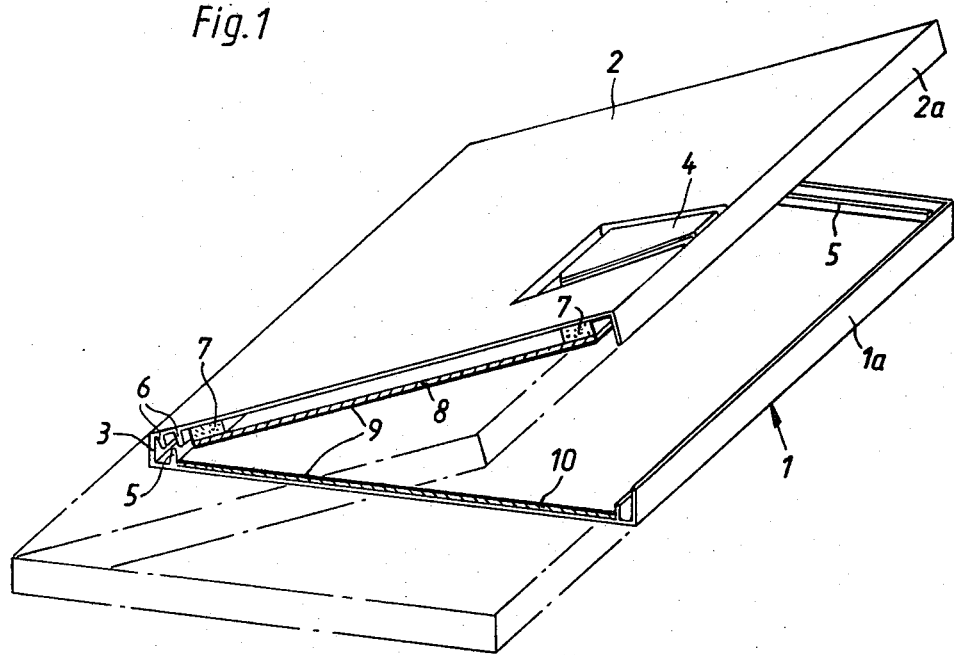
FIG. 1 is a perspective view of an X-ray film cassette in accordance with the invention, partially sectioned.

As can be seen from FIG. 1, an X-ray film cassette in accordance with the present invention has a body part which is identified by reference numeral 1 and a cover part which is identified by reference numeral 2. Body parts are connected with one another by a synthetic plastic hinge. A sinking handle 4 is provided on the cover part 2 and acts upon non-illustrated locking elements.

A lip 5 protrudes from the body part 1 inwardly of the cassette and extends over an outer edge. The lip 5 forms a rectangle corresponding to the dimension of a reinforcing foil. Two parallel lips 6 are provided on the cover part 2 in the region of the hinge. In closed condition of the cassette, the lips 6 of the cover part 2 are located at both sides of the lip 5 of the body part 1. A lateral web 2a of the cover part 2 engages in a groove formed by the lips 5 and a lateral web 1a of the body part 1 so as to form together with the lips 6 a light seal.

An elastic strip of an elastic foam material is arranged on the inner surface of the cover part 2. A magnetic plate 8 is mounted on the elastic strip 7. The magnetic plate 8 has dimensions which are substantially equal to the dimensions of a reinforcing foil 9, not shown X-ray film, and a counterplate 10. The counterplate 10 is mounted on the body part 1, for example by gluing. It is composed of a material which can be attracted by a magnetic force of the magnetic plate 8. The counterplate 10 can be formed, for example, by a very thin steel foil with a thickness of 0.05, advantageously, 0.02, millimeters, iron-containing board, a plastic material with embedded iron powder, or the like, which has to have as low an X-ray absorption as possible.

The magnetic plate 8 can be rigid or flexible. It is composed, for example, of an AlNiCo alloy, of oxide permanent magnet (Fe-Co-Oxide, Ba-, SR-Ferrite), magnetically coated PVC foils, or extruded magnets of oxide powder (ceramic materials such as iron oxide and barium oxide) and a binding agent.

Figure 3:
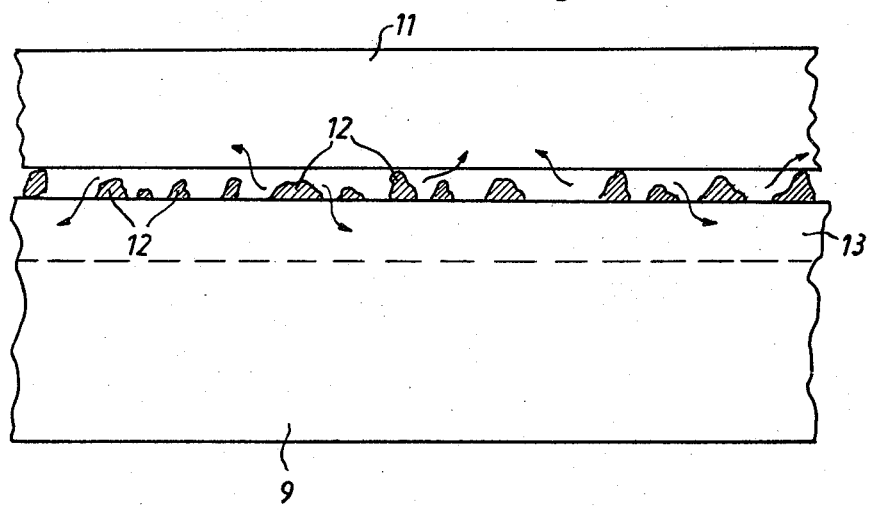
FIG. 3 is a view showing a section of a portion of an inventive reinforcing foil cooperating with a film.
Figure 4:
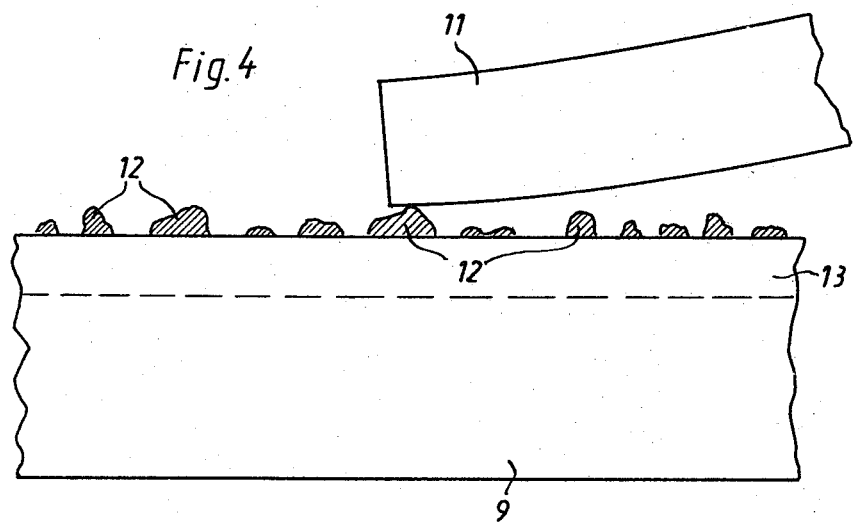
FIG. 4 is a view showing a section of the reinforcing foil of FIG. 3 with an insertable film.

The structure of the reinforcing foil 9 can be more clearly seen from FIGS. 3 and 4. The reinforcing foil 9 has an upper face which faces to a film 11, and in which a plurality of particles formed as grains or balls 12 are embedded. The dimension of these particles is within the range between 15 and 60, advantageously 25 to 50, micrometers. The particles are light-permeable or transparent, and are provided in the number of substantially 1500, advantageously 1200 particles per square centimeter.

Instead of the provision of the particles, the above mentioned upper face of the reinforcing foil can be roughened, for example by embossing with a heated roller or squeegee.

When the film 11 is being inserted into the cassette, the front edge slides over the reinforcing foil substantially along the latter, as can be seen in FIG. 4. The above mentioned sliding of the film edge during its insertion over the raised highly wear-resistant particles 12 holds the film 11 at a distance from a light-active layer 13 of the reinforcing foil 11. Thereby, the service life of the reinforcing foil is increased. In closed condition of the cassette, and with the inserted film 11, the film 11 is spaced by a certain distance from the light-active layer 13 of the reinforcing foil 9 and thereby makes possible flowing of air into the hollow space between the particles 12 and the film 11 and the reinforcing foil 9, as well as flowing of the air out of this hollow space. With the distance between the film and the foil, the picture sharpness is reduced only by a very small percentage. On the other hand, it is prevented that exposure is performed in condition of an air pocket. In the region of a very thick air pocket, a not sharp exposure can take place so that it must be again repeated.

For easier manipulation of the cassette, the reinforcing foils 9 are advantageously easily connected with the magnetic plate 8 and the counterplate 10, which facilitates the insertion of a film. Because of the magnetic film between the magnetic plate and the counterplate, a uniform pressure over the entire film surface is attained, which is a main criterion for high quality of picture. During opening of the cassette, the magnetic plate 8 adhering to the counterplate 10 is lifted together with the cover part 2 and the upper reinforcing foil 9, and the film 11 can be easily lifted from the other reinforcing foil by inducing the air between the particles 12, over the film falls or slides out of the other reinforcing foil under the action of its weight.

Figure 2:
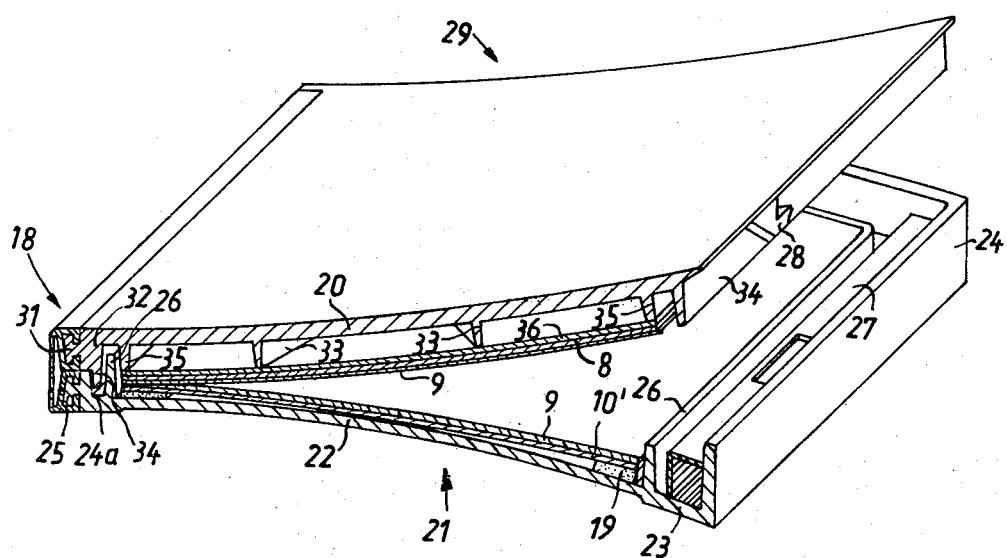
FIG. 2 is a perspective view of a partially open X-ray film cassette in accordance with a second embodiment of the invention.

Instead of the magnetic plate 8 being mounted on the elastic strip 7, the magnetic plate 8 can be integrated in the cover part 2 or fixed by a thin jacket over strips of foam material. In the event that the magnetic plate 8 is flexible, the uniformity of the pressure is further optimized. The X-ray film cassette in accordance with another embodiment of the invention is shown in FIG. 2, and its parts identical to the parts of the cassette of FIG. 1 are indicated by identical reference numerals. The cassette has a body part 21 with a flexible wall 22, a frame 23 extending over the edge of the wall, and a web 24 formed at three sides thereof. A web 24a of a smaller height is formed at the fourth side of the body part 21 and carries at its outer side a T-shaped guide 25.

A closed rib 25 is formed on the body part 21 at a small distance from the webs 24 or the web 24a. It provides for a light undercut and substantially limits the film exposing space. A locking bar 27 is provided at the side opposite to the web 24a and is formed between the web 24 and a rib 26. The locking bar 27 cooperates with a hook 28 of a cover part 29.

The cover part 29 is sandwich-like and has a flexible wall 20. A web 32 is formed at the hinged side and carries a T-shaped rail 31. The web 32 is connected via a flexible shaped part 18 with the guide 25. Diagonally extending webs 33 and two ribs 34 and 35 in the edge regions are formed at the inner side of the wall 20. The ribs 34 and 35 also serve for light undercutting and are arranged so that they engage the ribs 26 of the body part 21.

The webs 33 and the inner ribs 35 on the wall 20 have identical heights and carry a thin plate 36 of synthetic plastic material. The plate 36 is advantageously mounted on the webs and ribs by ultrasonic welding. With this sandwich-like construction, the wall 20 and the plate 36 have small thicknesses, and thereby provide for a low cassette weight, on the other hand, and guarantees an increased rigidity of the cover 29.

The magnetic plate 8 is mounted on the plate 36 at its inner side. The reinforcing foil 9 is, in turn, mounted on the magnetic plate 8.

A small X-ray-permeable elastic strip 19, advantageously made of foam material, is provided on the wall 22 of the body part 21. It is mounted on the wall 22 along the ribs 26 and inside the rectangle formed by the ribs 26. A thin foil 10' of a ferromagnetic material is mounted on the elastic strip 19 and forms a counterplate. The second reinforcing foil 9 is arranged on the foil 10'.

The walls 22 and 20 of the cassette have, in an inoperative position when the cassette is open, a slightly cylindrical pre-bend, so that the convex sides of these bends face towards one another. The plate 36, the magnetic plate 8 and the reinforcing foil 9 correspond in the open condition to these bends. The counterplate 10' and the other reinforcing foil 9, however, are in approximately flat position because of the floating suspension of the strip 19. For reinforcing of the relatively thin wall 22 of the body part 21, this wall can be provided with a spherical bend directed toward the cover part 29.

Because of the cylindrical bending of the walls 22 and 20, the cassette can be easily handled in automatic loading and unloading devices. Moreover, the magnetic pressure between the magnetic plate and the counterplate is of a great advantage when, during opening of the cassette, both the walls are not pulled from one another in a direction normal to one another, but the walls are peeled because of the cylindrical bending. Because of the provision of the rough surface of the reinforcing foil 9, a film can be easily released from the foil and removed from the cassette.

The counterplate 10' can be further laminated with a thin polyester or polyethylene foil with a thickness of approximately 0.05 millimeters. Thereby, the counterplate 10' is utilized for corrosion protection. Moreover, it is insignificantly stiffened by these laminations, whereby the danger of creasing is considerably reduced. The X-ray absorption is not substantially increased by this foil.

It will be understood that each of the elements described above, or two or more together, may also find a useful application in other types of constructions differing from the types described above.

While the invention has been illustrated and described as embodied in an X-ray film cassette, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An X-ray film cassette, comprising a body part; a cover part movable relative to said body part between open and closed position; locking means for locking and unlocking said body and cover parts relative to one another; magnetic means including a magnetic plate and a counterplate attractable to said magnetic plate, said magnetic and counterplates being associated with said body and cover parts; and at least a reinforcing foil arranged to be brought together with a film between said magnetic plate and counterplate, said reinforcing foil having a surface arranged to face toward the film and being rough with a roughness of between 10 and 60 microns.

2. An X-ray film cassette as defined in claim 1, wherein said rough surface of said reinforcing foil has a roughness of between 25 and 50 microns.

3. An X-ray film cassette as defined in claim 1, wherein the cassette is to hold the film of a predetermined dimensions, said magnetic plate having dimensions corresponding to the dimension of the film.

4. An X-ray film cassette as defined in claim 1, wherein at least one of said magnetic plate and counterplates is elastically mounted on a respective one of said bodies.

5. An X-ray film cassette as defined in claim 1, wherein said rough surface of said reinforcing foil is formed as an embossed surface.

6. An X-ray film cassette as defined in claim 5, wherein said rough surface of said reinforcing foil is formed as a hot-embossing-roller-embossed surface.

7. An X-ray film cassette as defined in claim 5, wherein said rough surface of said reinforcing foil is a squeegee-embossed surface.

8. An X-ray film cassette as defined in claim 1, wherein said reinforcing foil has a substantially smooth face arranged to face toward the film, and a plurality of particles extending outwardly beyond said face so as to form said rough surface.

9. An X-ray film cassette as defined in claim 8, wherein said particles forming said rough surface of said reinforcing foil are formed as grains.

10. An X-ray film cassette as defined in claim 8, wherein said particles forming said rough surface of said reinforcing foil are formed as balls.

11. An X-ray film cassette as defined in claim 8, wherein said plurality of particles forming said rough surface of said reinforcing foil includes at most 1500 particles per $cm^2$ of said face of said reinforcing foil.

12. An X-ray film cassette as defined in claim 11, wherein said plurality of particles forming said rough surface of said reinforcing foil includes between 800 and 1200 particles per $cm^2$ of said face of said reinforcing foil.

13. An X-ray film cassette as defined in claim 8, wherein said particles forming said rough surface of said reinforcing foil are light-permeable.

14. An X-ray film cassette as defined in claim 4; and further comprising means for elastically mounting at least one of said magnetic and counterplates on a respective one of said body and cover parts and including an elastic strip.

15. An X-ray film cassette as defined in claim 14, wherein said one elastically mounted part has edges with a predetermined contour, said elastic strip of said elastically mounting means extending along said edges over said entire contour thereof.

16. An X-ray film cassette as defined in claim 14, wherein said elastic strip of said elastically mounting means is composed of an elastic foam material.

* * * * *